United States Patent
Watanabe et al.

(10) Patent No.: US 12,147,483 B2
(45) Date of Patent: Nov. 19, 2024

(54) REFLECTING METADATA ANNOTATED IN CRAWLED DOCUMENTS TO ORIGINAL DATA SOURCES

(71) Applicant: International Business Machines Corporation, Armonk, NY (US)

(72) Inventors: Kenta Watanabe, Soka (JP); Takahito Tashiro, Tokyo (JP); Yoshitaka Kurokawa, Tokyo (JP); Taihei Miyamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 17/650,390

(22) Filed: Feb. 9, 2022

(65) Prior Publication Data
US 2023/0252092 A1 Aug. 10, 2023

(51) Int. Cl.
*G06F 16/951* (2019.01)
*G06F 40/103* (2020.01)
*G06F 40/169* (2020.01)

(52) U.S. Cl.
CPC .......... *G06F 16/951* (2019.01); *G06F 40/103* (2020.01); *G06F 40/169* (2020.01)

(58) Field of Classification Search
CPC ..... G06F 16/951; G06F 40/103; G06F 40/169
USPC ......................................................... 707/709
See application file for complete search history.

(56) References Cited

U.S. PATENT DOCUMENTS

| | | | |
|---|---|---|---|
| 8,386,459 B1 | 2/2013 | Auerbach | |
| 8,601,028 B2 | 12/2013 | Liao | |
| 8,626,794 B2 | 1/2014 | Liao | |
| 9,305,091 B2 * | 4/2016 | Zhu | G06F 40/134 |
| 2003/0149694 A1 | 8/2003 | Ma | |
| 2005/0165852 A1 * | 7/2005 | Albornoz | G06F 16/907 |
| 2007/0143263 A1 | 6/2007 | Agrawal | |
| 2009/0182804 A1 | 7/2009 | Arbusto | |
| 2009/0204610 A1 | 8/2009 | Hellstrom | |
| 2010/0169304 A1 | 7/2010 | Hendricksen | |

(Continued)

FOREIGN PATENT DOCUMENTS

| | | |
|---|---|---|
| JP | 2009048380 A | 3/2009 |
| JP | 2012256095 A | 12/2012 |
| WO | 2009107148 A1 | 9/2009 |

OTHER PUBLICATIONS

"Adding Classifiers to a Crawler", AWS Glue, accessed on Dec. 7, 2021, 4 pages, <https://docs.aws.amazon.com/glue/latest/dg/add-classifier.html>.

(Continued)

*Primary Examiner* — Hosain T Alam
*Assistant Examiner* — Saba Ahmed
(74) *Attorney, Agent, or Firm* — CANTOR COLBURN LLP; Teddi Maranzano (57) ABSTRACT

A computer-implemented method, a computer program product, and a computer system for reflecting metadata annotated in crawled documents to original data sources. In response to one or more internal documents in an application being annotated with metadata, the computer system converts a metadata format handled in the application to a metadata format handled in one or more data sources. The computer system posts, to one or more original documents in the one or more data sources, the metadata in the metadata format handled in the one or more data sources.

16 Claims, 8 Drawing Sheets

(56) References Cited

U.S. PATENT DOCUMENTS

| | | |
|---|---|---|
| 2011/0213764 A1 | 9/2011 | Stone |
| 2013/0144858 A1 | 6/2013 | Lin |
| 2013/0212100 A1 | 8/2013 | Hajaj |
| 2016/0070791 A1* | 3/2016 | Eberhart ............... G06F 16/951 707/706 |
| 2016/0239512 A1* | 8/2016 | Madisch ............... G06F 16/245 |

OTHER PUBLICATIONS

"Crawlers", IBM Watson Content Analytics, IBM Content Analytics with Enterprise Search, Version 3.0.0, accessed on Dec. 7, 2021, 2 pages, <https://www.ibm.com/docs/en/wca/3.0.0?topic=overview-crawlers>.

Coletta et al., "Public Data Integration with WebSmatch", WOD '12, May 25, 2012, Nantes, France, Copyright 2012 ACM 978-1-4503-1404-6/12/05, 8 pages.

Mell et al., "The NIST Definition of Cloud Computing", National Institute of Standards and Technology U.S. Department of Commerce, Special Publication 800-145, Sep. 2011, 7 pages.

Roesler et al., "Special Topics in Multimedia, IoT and Web Technologies", 201 Springer Nature Switzerland AG 2020, 293 pages.

Miyamoto et al., "Coordinating Schedules of Crawling Documents Based on Metadata Added to the Documents by Text Mining", U.S. Appl. No. 17/650,394, filed Feb. 9, 2022, 36 pages.

IBM Appendix P, list of patents and patent applications treated as related, Filed Herewith, 2 pages.

* cited by examiner

REFLECTING METADATA ANNOTATED IN CRAWLED DOCUMENTS TO ORIGINAL DATA SOURCES

BACKGROUND

The present invention relates generally to metadata annotated in crawled documents, and more particularly to reflecting metadata annotated in crawled documents to original data sources.

Search applications (such as IBM Watson Explorer and Watson Discovery) crawl original documents (such as text files, PDF files, Microsoft Word, Excel, and PowerPoint files) from original data sources (such as document management and storage systems). Then, search applications convert original documents to internal documents. Internal documents may be database records or indexed data, depending on the implementation.

The original documents and the internal documents have almost the same information, including document content and metadata (such as names of authors); however, formats of the original documents and the internal documents are different. The internal documents are internal data such as database record, while the original documents are just files. The internal documents have additional information such as "field". The "filed" might be added by the search application automatically. The "filed" may be also added by a user's manual operation.

SUMMARY

In one aspect, a computer-implemented method for reflecting metadata annotated in crawled documents to original data sources is provided. The computer-implemented method includes, in response to one or more internal documents in an application being annotated with metadata, converting a metadata format handled in the application to a metadata format handled in one or more data sources. The computer-implemented method further includes posting, to one or more original documents in the one or more data sources, the metadata in the metadata format handled in the one or more data sources.

In another aspect, a computer program product for reflecting metadata annotated in crawled documents to original data sources is provided. The computer program product comprises a computer readable storage medium having program instructions embodied therewith, and the program instructions are executable by one or more processors. The program instructions are executable to: in response to one or more internal documents in an application being annotated with metadata, convert a metadata format handled in the application to a metadata format handled in one or more data sources; post, to one or more original documents in the one or more data sources, the metadata in the metadata format handled in the one or more data sources.

In yet another aspect, a computer system for reflecting metadata annotated in crawled documents to original data sources is provided. The computer system comprises one or more processors, one or more computer readable tangible storage devices, and program instructions stored on at least one of the one or more computer readable tangible storage devices for execution by at least one of the one or more processors. The program instructions are executable to, in response to one or more internal documents in an application being annotated with metadata, convert a metadata format handled in the application to a metadata format handled in one or more data sources. The program instructions are further executable to post, to one or more original documents in the one or more data sources, the metadata in the metadata format handled in the one or more data sources.

DETAILED DESCRIPTION

Embodiments of the present invention provide a method for reflecting metadata annotated in a document (internal document) in an application to a document (original document) of an original data source of the application. The metadata here includes enrichment automatically added by the application and a tag manually added by a user.

Figure 1:
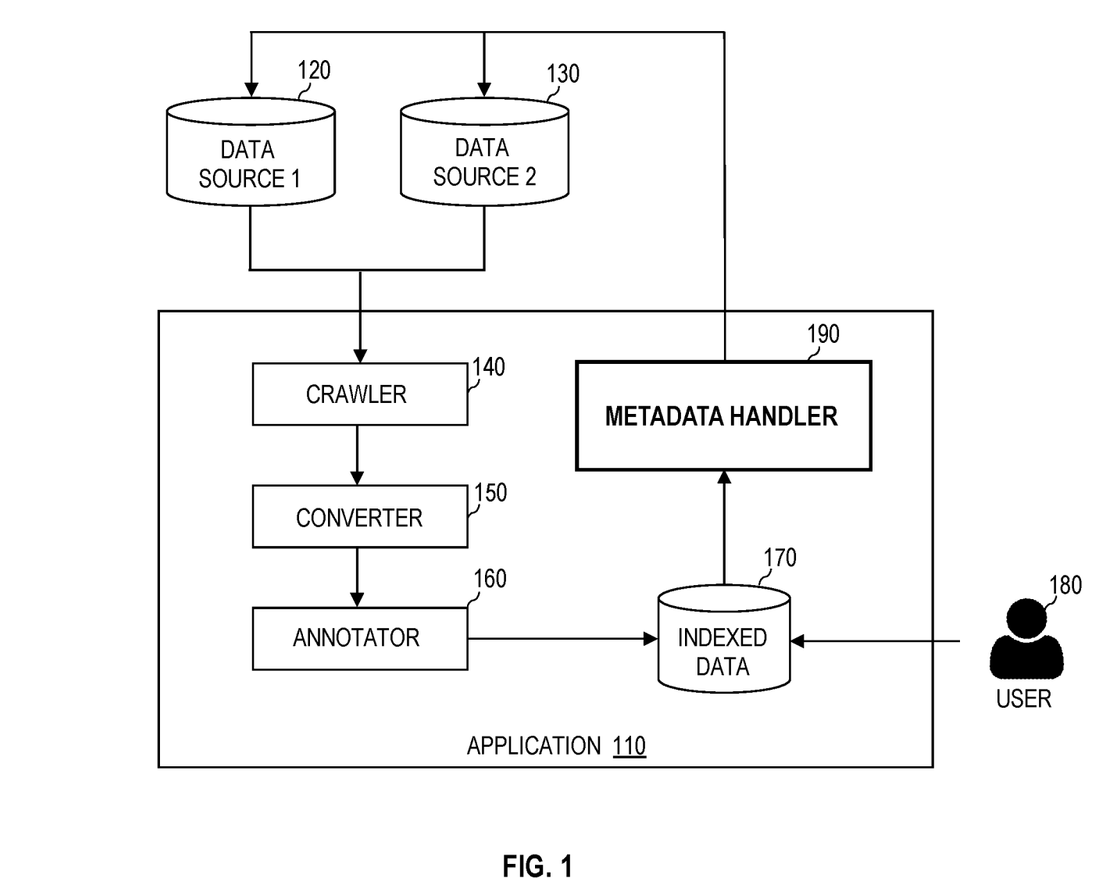
FIG. 1 is a diagram illustrating a system for reflecting metadata annotated in crawled documents to original data sources, in accordance with one embodiment of the present invention.

FIG. 1 is a diagram illustrating a system for reflecting metadata annotated in crawled documents to original data sources, in accordance with one embodiment of the present invention. The system for reflecting metadata annotated in crawled documents to original data sources includes application 110 and data sources (namely, data source 1 120 and data source 2 130). For the purpose of illustration, FIG. 1 shows two data sources. It should be appreciated that FIG. 1 provides only an illustration of one implementation and does not imply any limitations; the system for reflecting metadata annotated in crawled documents to original data sources may include any number of data sources.

Application 110 is a search application configured to crawl documents from data source 1 120 and data source 130. Examples of application 110 are IBM Watson Explorer and IBM Watson Discovery. Data source 1 120 and data source 2 130 are document management systems.

Application 110 includes crawler 140, converter 150, and annotator 160. Crawler 140 is a component that crawls original documents in data source 1 120 and data source 2 130. The original documents in the data source may include, for example, text files, PDF files, Microsoft Word, Excel, and PowerPoint files. Converter 150 is a component that converts the original documents crawled by crawler 140 from data source 1 120 and data source 2 130 into internal documents with a format handled in application 110. Annotator 160 is a component that automatically add additional information such as "filed" into the internal documents. In this document, the "field" may be called as "tag" or "flag". Also, the additional information may be manually added by user 180. The annotated internal documents (which are with automatically or manually added metadata) are stored in indexed data 170.

One embodiment of the present invention adds a component: metadata handler 190. Metadata handler 190 may be an added component of application 110. FIG. 1 shows the added component in application 110. In another embodiment, a metadata handler may be a separate component (which is independent of application 110). Metadata handler 190 reconverts the metadata handled in application 110 into a format handled in the original data sources (data source 1 120 and data source 2 130). Metadata handler 190 issues a request for reflecting the metadata to the original data sources (data source 1 120 and data source 2 130); for example, metadata handler 190 issues POST API Call so that metadata called a "Document Flag" in application 110 is converted into metadata called "Filtering Tag" in a data source (data source 1 120 or data source 2 130) and then is added to a document in the data source.

Metadata handler 190 as well as application 110 is implemented on one or more servers. A server is described in more detail in later paragraphs with reference to FIG. 6. The operational steps may be implemented in a cloud computing environment. The cloud computing environment is described in more detail in later paragraphs with reference to FIG. 7 and FIG. 8.

Figure 2:
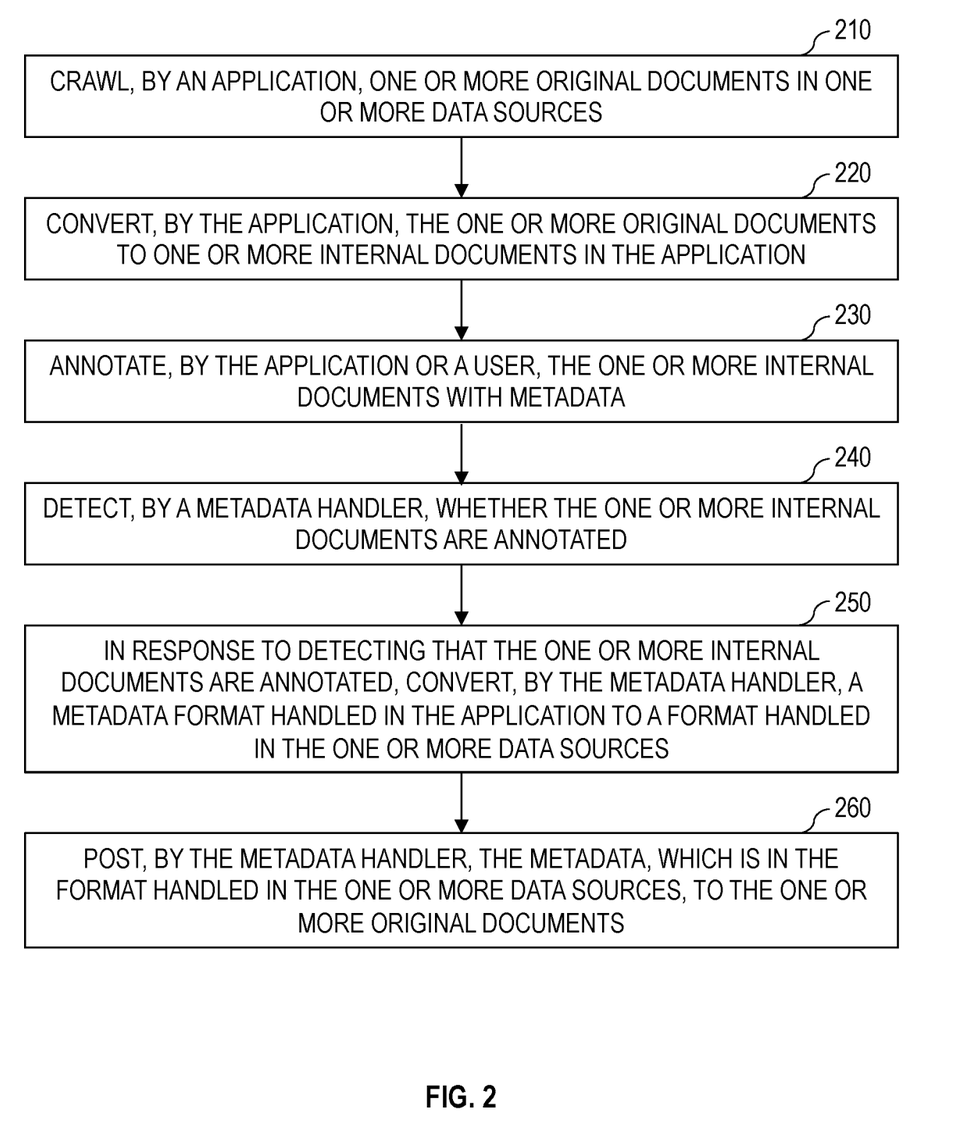
FIG. 2 is a flowchart showing operational steps for reflecting metadata annotated in crawled documents to original data sources, in accordance with one embodiment of the present invention.

FIG. 2 is a flowchart showing operational steps for reflecting metadata annotated in crawled documents to original data sources, in accordance with one embodiment of the present invention. At step 210, an application crawls one or more original documents in one or more data sources. In the embodiment shown in FIG. 1, crawler 140 in application 110 crawls the one or more original documents in data source 1 120 and data source 2 130.

At step 220, the application converts the one or more original documents to one or more internal documents in the application. In the embodiment shown in FIG. 1, converter 150 in application 110 converts the one or more original documents in data source 1 120 and data source 2 130 to one or more internal documents in application 110.

At step 230, the application annotates the one or more internal documents with metadata. In the example shown in FIG. 1, annotator 160 in application 110 annotates the one or more internal documents. In another embodiment, the application receives annotated metadata from a user. In the example shown in FIG. 1, application 110 receives the annotated metadata from user 180.

At step 240, a metadata handler detects whether the one or more internal documents are annotated. In one embodiment, the metadata handler is a component of the application; for example, in the example shown in FIG. 1, metadata handler 190 is a component of application 110, and it detects whether the one or more internal documents in data source 1 120 and data source 2 130 are annotated. In another embodiment, the metadata handler may be a separate component (which is independent of application 110).

At step 250, the metadata handler converts a metadata format handled in the application to a format handled in the one or more data sources, in response to detecting that the one or more internal documents are annotated. In the example shown in FIG. 1, metadata handler 190 in application 110 converts a metadata format handled in application 110 to a format handled in data source 1 120 and data source 2 130.

At step 260, the metadata handler posts the metadata, which is in the format handled in the one or more data sources, to the one or more original documents. In the example shown in FIG. 1, metadata handler 190 in application 110 posts the metadata (with the converted format) to the one or more original documents in data source 1 120 and data source 2 130.

Figure 3:
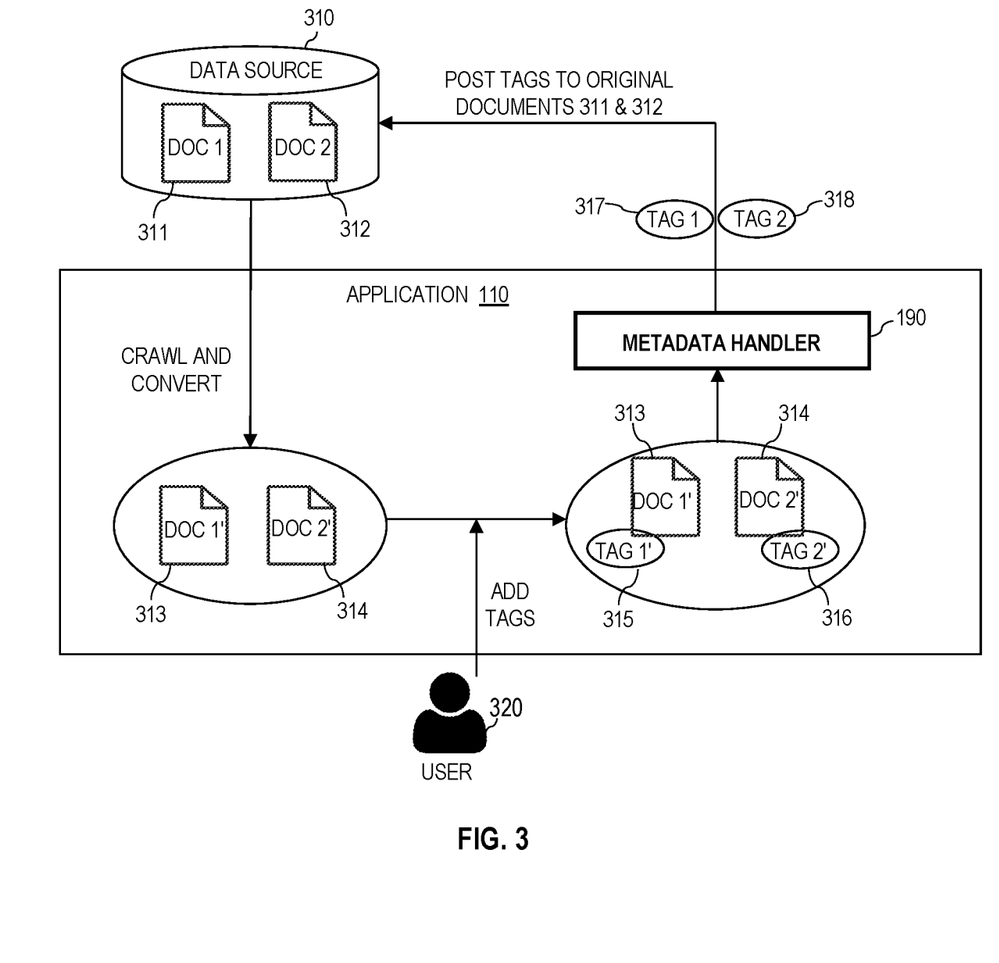
FIG. 3 is a diagram illustrating a first use case of a system for reflecting metadata annotated in crawled documents to original data sources, in accordance with one embodiment of the present invention.

FIG. 3 is a diagram illustrating a first use case of a system for reflecting metadata annotated in crawled documents to original data sources, in accordance with one embodiment of the present invention. As shown in FIG. 3, data source 310 includes original document DOC 1 311 and original document DOC 2 312. Application 110 crawls original document DOC 1 311 and original document DOC 2 312, and application 110 converts the original documents to internal document DOC 1' 313 and internal document DOC 2' 314. Original document DOC 1 311 and original document DOC 2 312 have a format handled in data source 310, while internal document DOC 1' 313 and internal document DOC 2' 314 have a format handled in application 110. User 320 adds tags to the internal documents. User 320 adds tag 1' 315 to internal document DOC 1' 313 and tag 2' 316 internal document DOC 2' 314.

Referring to FIG. 3, metadata handler 190 in application 110 converts tag 1' 315 and tag 2' 316 to tag 1 317 and tag 2 318, respectively. Tag 1' 315 and tag 2' 316 have a format handled in application 110, while tag 1 317 and tag 2 318 have a format handled in data source 310. Metadata handler 190 posts tag 1 317 to original document DOC 1 311 and posts tag 2 318 to original document DOC 2 312 in data source 310.

Figure 4:
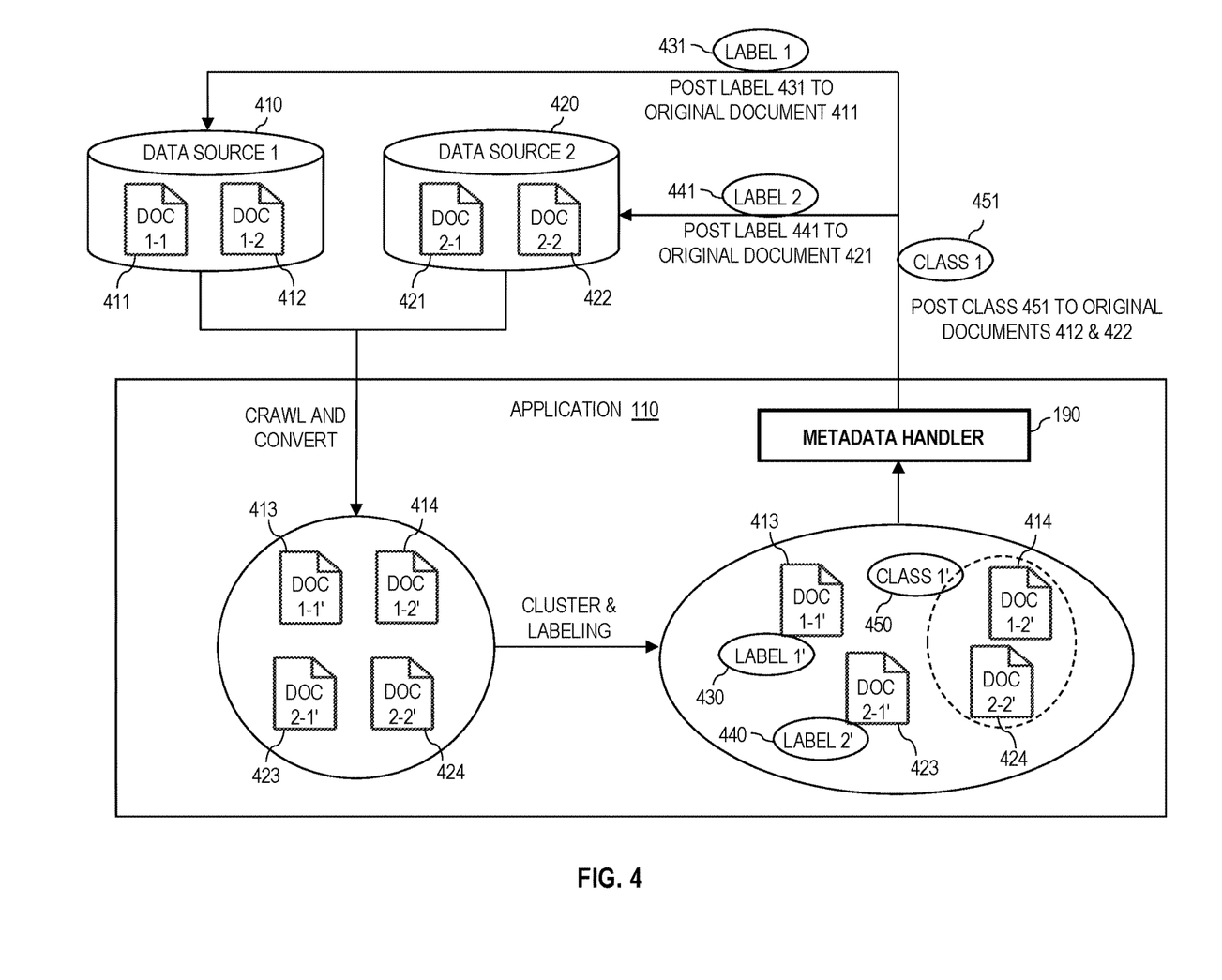
FIG. 4 is a diagram illustrating a second use case of a system for reflecting metadata annotated in crawled documents to original data sources, in accordance with one embodiment of the present invention.

FIG. 4 is a diagram illustrating a second use case of a system for reflecting metadata annotated in crawled documents to original data sources, in accordance with one embodiment of the present invention. As shown in FIG. 4, there are two data sources, namely data source 1 410 and data source 2 420. Data source 1 410 includes original document DOC 1-1 411 and original document DOC 1-2 412. Data source 2 420 includes original document DOC 2-1 421 and original document DOC 2-2 422. Application 110 crawls original document DOC 1-1 411, original document DOC 1-2 412, original document DOC 2-1 421, and original document DOC 2-2 422. The original documents have a format handled in data source 1 410 and data source 2 420. Application 110 converts original document DOC 1-1 411 to internal document DOC 1-1' 413, original document DOC 1-2 412 to internal document DOC 1-2' 414, original document DOC 2-1 421 to internal document DOC 2-1' 423, and original document DOC 2-2 422 to internal document DOC 2-2' 424. The internal documents have a format handled in application 110.

Referring to FIG. 4, application 110 clusters and labels the internal documents. Application 110 labels internal document DOC 1-1' 413 with label 1' 430 and labels internal document DOC 2-1' 423 with label 2' 440. For example, internal document DOC 1-1' 413 is labeled as "important" and internal document DOC 2-1' 423 is labeled as "confidential". Application 110 clusters internal document DOC 1-2' 414 and internal document DOC 2-2' 424 into class 1' 450. For example, internal document DOC 1-2' 414 and internal document DOC 2-2' 424 are classified as "accident reports".

Referring to FIG. 4, metadata handler 190 in application 110 converts label 1' 430 to label 1 431 and label 2' 440 to label 2 441. Label 1' 430 and label 2' 440 have a format handled in application 110, while label 1 431 and label 2 441 have a format handled in data source 1 410 and data source 2 420. Metadata handler 190 converts the metadata about class 1' 450 to the metadata about class 1 451. The metadata about class 1' 450 has a format handled in application 110, while the metadata about class 1 451 has a format handled in data source 1 410 and data source 2 420.

Referring to FIG. 4, metadata handler 190 posts label 1 431 to original document DOC 1-1 411 in data source 1 410 and posts label 2 441 to original document DOC 2-1 421 in data source 2 420. Metadata handler 190 posts the metadata about class 1 451 to original document DOC 1-2 412 in data source 1 410 and original document DOC 2-2 422 in data source 2 420.

Figure 5:
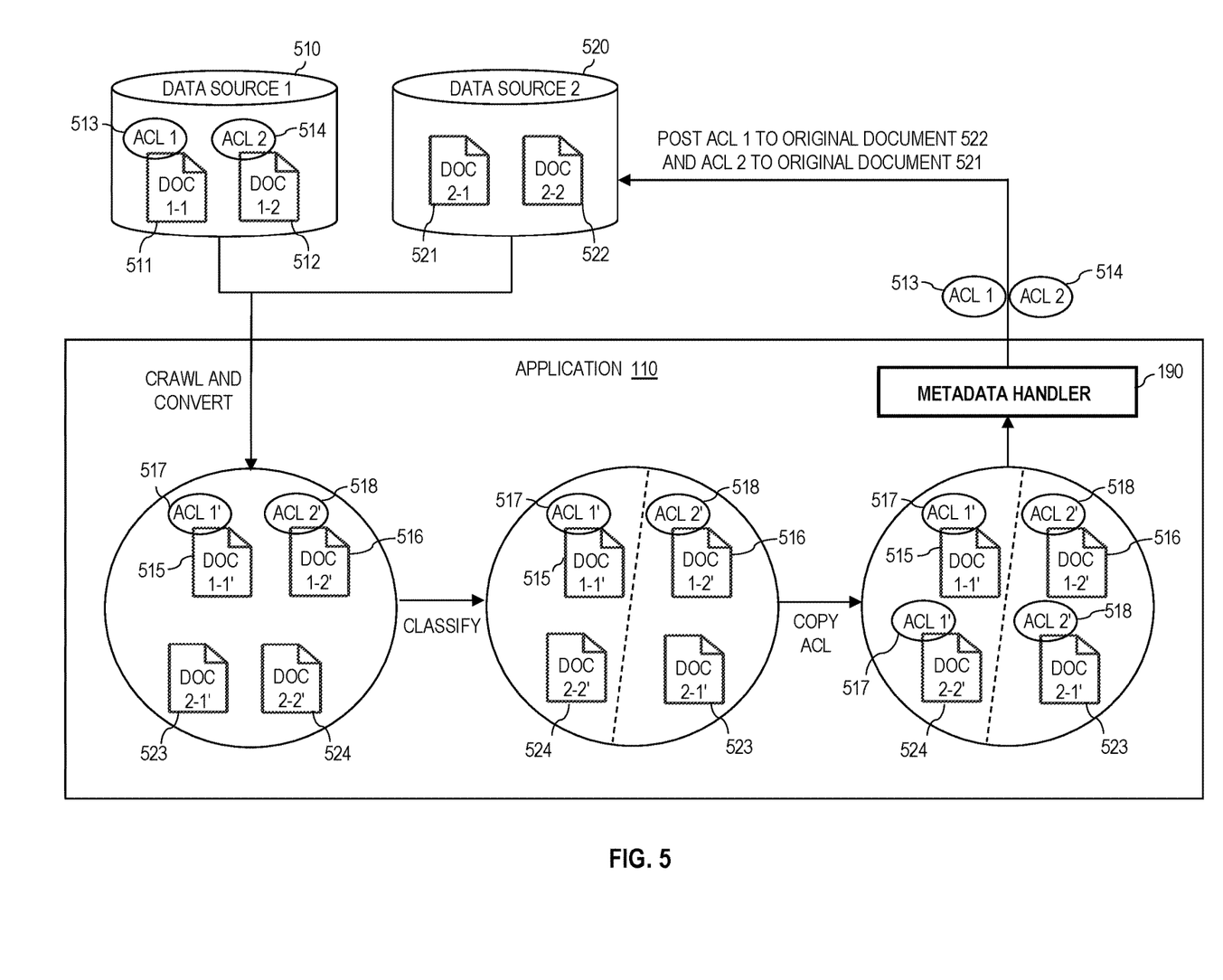
FIG. 5 is a diagram illustrating a third use case of a system for reflecting metadata annotated in crawled documents to original data sources, in accordance with one embodiment of the present invention.

FIG. 5 is a diagram illustrating a third use case of a system for reflecting metadata annotated in crawled documents to original data sources, in accordance with one embodiment of the present invention. As shown in FIG. 5, there are two data sources, namely data source 1 510 and data source 2 520. Data source 1 510 includes original document DOC 1-1 511 and original document DOC 1-2 512. Data source 2 520 includes original document DOC 2-1 521 and original document DOC 2-2 522. In data source 1 510, original document DOC 1-1 511 has access-control list ACL 1 513 and original document DOC 1-2 512 has access-control list ACL 2 514.

Referring to FIG. 5, application 110 crawls original document DOC 1-1 511, original document DOC 1-2 512, original document DOC 2-1 521, and original document DOC 2-2 522. The original documents have a format handled in data source 1 510 and data source 2 520. Application 110 converts original document DOC 1-1 511 to internal document DOC 1-1' 515, original document DOC 1-2 512 to internal document DOC 1-2' 516, original document DOC 2-1 521 to internal document DOC 2-1' 523, and original document DOC 2-2 522 to internal document DOC 2-2' 524. The internal documents have a format handled in application 110.

Referring to FIG. 5, access-control list ACL 1 513 and access-control list ACL 2 514 have a format handled in data source 1 510. Application 110 converts access-control list ACL 1 513 to access-control list ACL 1' 517 and access-control list ACL 2 514 to access-control list ACL 2' 518. Access-control list ACL 1' 517 and access-control list ACL 2' 518 have a format handled in application 110.

Referring to FIG. 5, application 110 classifies the internal documents into two groups. The first group includes internal document DOC 1-1' 515 with access-control list ACL 1' 517 and internal document DOC 2-2' 524. The second group includes internal document DOC 1-2' 516 with access-control list ACL 2' 518 and internal document DOC 2-1' 523.

Referring to FIG. 5, in the first group, application 110 copies access-control list ACL 1' 517 from internal document DOC 1-1' 515 to internal document DOC 2-2' 524. In the second group, application 110 copies access-control list ACL 2' 518 from internal document DOC 1-2' 516 to internal document DOC 2-1' 523.

Referring to FIG. 5, metadata handler 190 in application 110 converts access-control list ACL 1' 517 attached to internal document DOC 2-2' 524 and access-control list ACL 2' 518 attached to internal document DOC 2-1' 523 back to a format handled in data source 2 520; metadata handler 190 converts access-control list ACL 1' 517 to access-control list ACL 1 513 and converts access-control list ACL 2' 518 to access-control list ACL 2 514. Metadata handler 190 posts access-control list ACL 1 513 to original document DOC 2-2 522 in data source 2 520. Metadata handler 190 posts access-control list ACL 2 514 to original document DOC 2-1 521 in data source 2 520.

Figure 6:
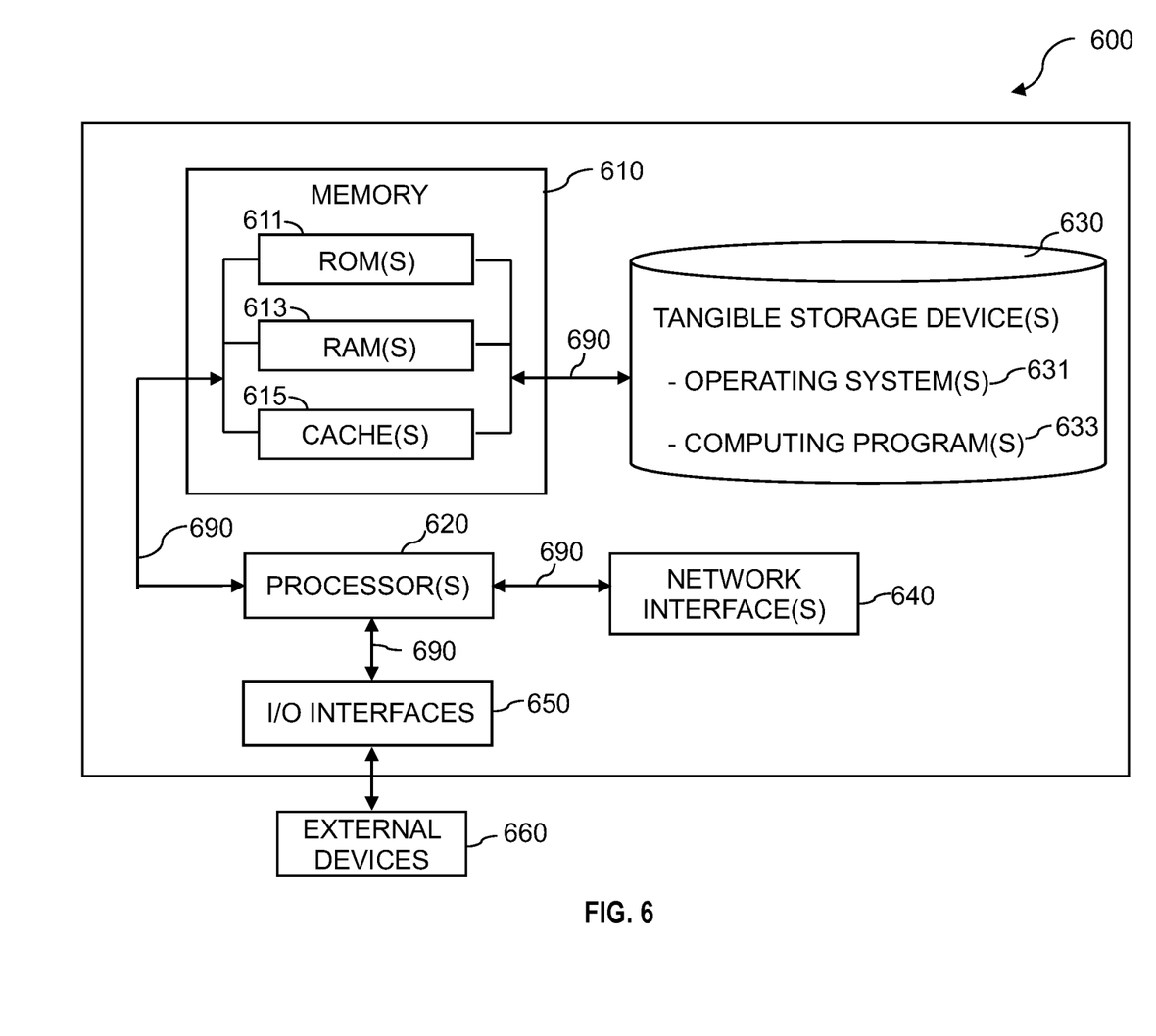
FIG. 6 is a diagram illustrating components of a computer system or server, in accordance with one embodiment of the present invention.

FIG. 6 is a diagram illustrating components of computer system or server 600, in accordance with one embodiment of the present invention. It should be appreciated that FIG. 6 provides only an illustration of one implementation and does not imply any limitations; different embodiments may be implemented.

Referring to FIG. 6, computer system or server 600 includes processor(s) 620, memory 610, and tangible storage device(s) 630. In FIG. 6, communications among the above-mentioned components of computer system or server 600 are denoted by numeral 690. Memory 610 includes ROM(s) (Read Only Memory) 611, RAM(s) (Random Access Memory) 613, and cache(s) 615. One or more operating systems 631 and one or more computer programs 633 reside on one or more computer readable tangible storage device(s) 630.

Computer system or server 600 further includes I/O interface(s) 650. I/O interface(s) 650 allows for input and output of data with external device(s) 660 that may be connected to server 600. Computer system or server 600 further includes network interface(s) 640 for communications between computer system or server 600 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
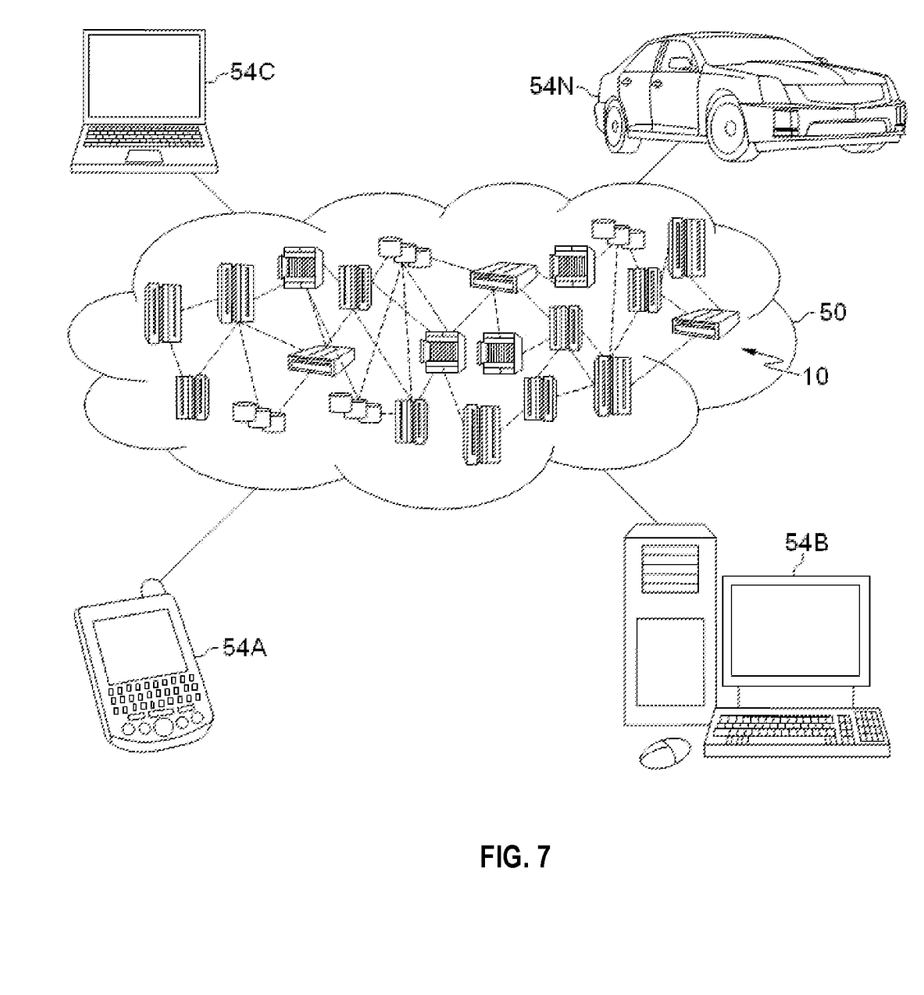
FIG. 7 depicts a cloud computing environment, in accordance with one embodiment of the present invention.

Referring now to FIG. 7, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 8:
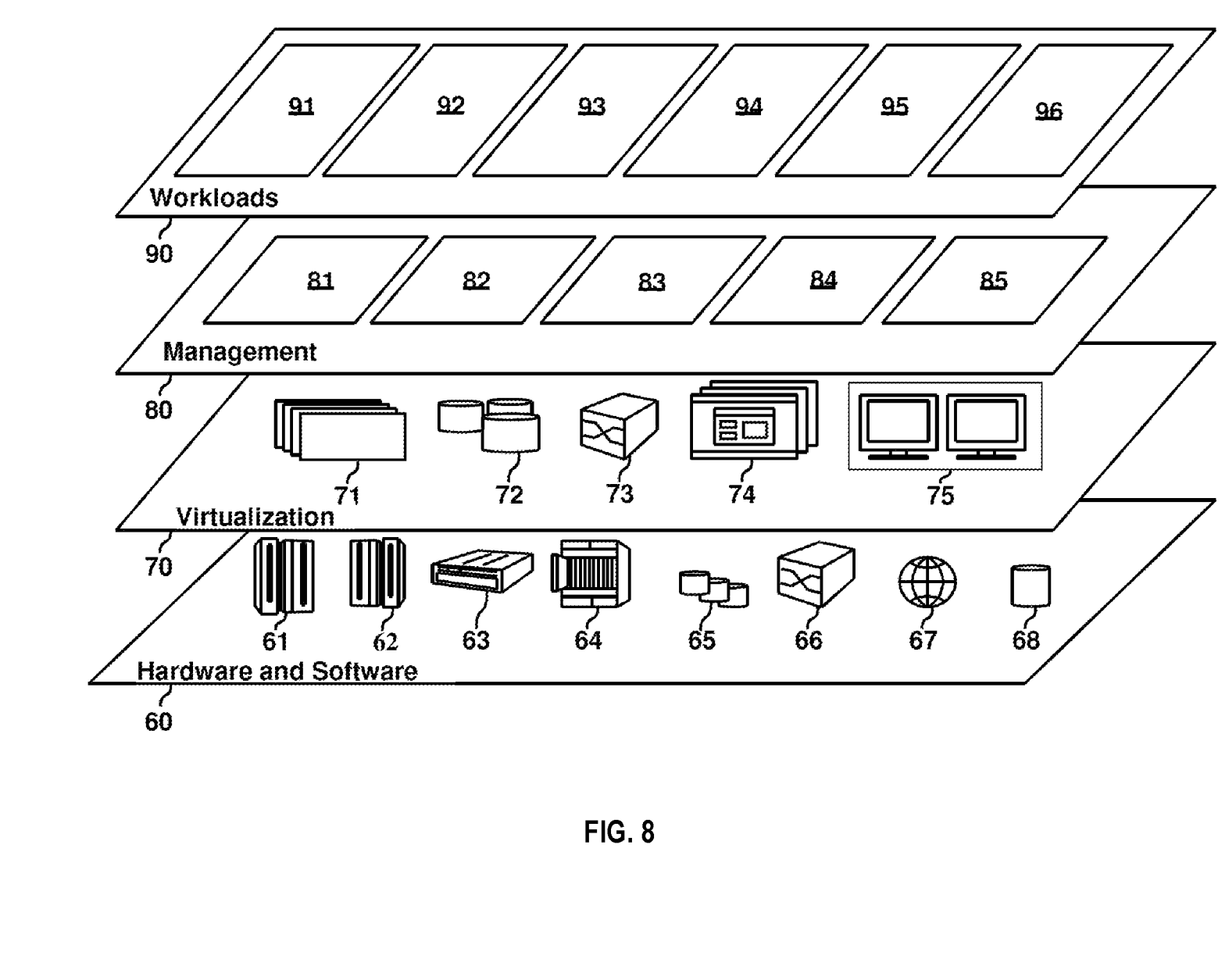
FIG. 8 depicts abstraction model layers in a cloud computing environment, in accordance with one embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of reflecting metadata annotated in crawled documents to original data sources.

What is claimed is:

1. A computer-implemented method for reflecting metadata annotated in crawled documents to original data sources, the method comprising:
    crawling, by an application on a server, one or more original documents in one or more original data sources;

converting, by the application, the one or more original documents to one or more internal documents in the application;

detecting, by a metadata handler of the application, an annotation of the one or more internal documents, wherein the annotation is made in a first metadata format that is supported by the application;

in response to detecting that the one or more internal documents have been clustered into one or more classes, creating, by the application, metadata about the one or more classes in the first metadata format;

converting, by the application, the annotation of the one or more internal documents and the metadata about the one or more classes from the first metadata format to a second metadata format, which is different than the first metadata format, that is supported by the one or more original data sources; and posting, by the application, to the one or more original documents in the one or more original data sources, the annotation of the one or more internal documents and the metadata about the one or more classes in the second metadata format handled in the one or more original data sources.

2. The computer-implemented method of claim 1, wherein converting the first metadata format handled in the application and posting the converted metadata to the one or more original documents are implemented by the metadata handler in the application.

3. The computer-implemented method of claim 1, further comprising:

in response to one or more tags being added to the one or more internal documents, converting, by the application, the one or more tags to a tag format handled in the one or more original data sources; and posting, by the application, to the one or more original documents, the one or more tags in the tag format handled in the one or more original data sources.

4. The computer-implemented method of claim 1, further comprising:

in response to one or more labels being added to the one or more internal documents, converting, by the application, the one or more labels to a label format handled in the one or more original data sources;

posting, by the application, to the one or more original documents, the one or more labels in the label format handled in the one or more original data sources.

5. The computer-implemented method of claim 1, further comprising:

in response to one or more access-control lists in a first group of the one or more internal documents being copied to a second group of the one or more internal documents, converting, by the application, metadata about the one or more access-control lists to the second metadata format handled in the one or more original data sources;

posting, by the application, to the second group of the one or more internal documents, the converted metadata about the one or more access-control lists in the second metadata format handled in the one or more original data sources.

6. A computer program product for reflecting metadata annotated in crawled documents to original data sources, the computer program product comprising a computer readable storage medium having program instructions embodied therewith, the program instructions executable by one or more processors, the program instructions executable to:

crawl, by an application on a server, one or more original documents in one or more original data sources;

convert, by the application, the one or more original documents to one or more internal documents in the application;

detect, by a metadata handler of the application, an annotation of the one or more internal documents, wherein the annotation is made in a first metadata format that is supported by the application;

create, by the application, metadata about the one or more classes in the first metadata format based on detecting that the one or more internal documents have been clustered into one or more classes;

convert, by the application, the annotation of the one or more internal documents and the metadata about the one or more classes from the first metadata format to a second metadata format, which is different than the first metadata format, that is supported by the one or more original data sources; and post, by the application, to the one or more original documents in the one or more original data sources, the annotation of the one or more internal documents and the metadata about the one or more classes in the second metadata format handled in the one or more original data sources.

7. The computer program product of claim 6, wherein converting the first metadata format handled in the application and posting the converted metadata to the one or more original documents are implemented by the metadata handler in the application.

8. The computer program product of claim 6, further comprising the program instructions executable to:

in response to one or more tags being added to the one or more internal documents, convert, by the application, the one or more tags to a tag format handled in the one or more original data sources; and post, by the application, to the one or more original documents, the one or more tags in the tag format handled in the one or more original data sources.

9. The computer program product of claim 6, further comprising the program instructions executable to:

in response to one or more labels being added to the one or more internal documents, convert, by the application, the one or more labels to a label format handled in the one or more original data sources;

post, by the application, to the one or more original documents, the one or more labels in the label format handled in the one or more original data sources.

10. The computer program product of claim 6, further comprising the program instructions executable to:

in response to one or more access-control lists in a first group of the one or more internal documents being copied to a second group of the one or more internal documents, convert, by the application, metadata about the one or more access-control lists to the second metadata format handled in the one or more original data sources;

post, by the application, to the second group of the one or more internal documents, the converted metadata about the one or more access-control lists in the second metadata format handled in the one or more original data sources.

11. A computer system for reflecting metadata annotated in crawled documents to original data sources, the computer system comprising:

one or more processors, one or more computer readable tangible storage devices, and program instructions stored on at least one of the one or more computer readable tangible storage devices for execution by at least one of the one or more processors, the program instructions executable to:

crawl, by an application on a server, one or more original documents in one or more original data sources;

convert, by the application, the one or more original documents to one or more internal documents in the application;

detect, by a metadata handler of the application, an annotation of the one or more internal documents, wherein the annotation is made in a first metadata format that is supported by the application;

create, by the application, metadata about the one or more classes in the first metadata format based on detecting that the one or more internal documents have been clustered into one or more classes;

convert, by the application, the annotation of the one or more internal documents and the metadata about the one or more classes from a first metadata format to a second metadata format, which is different than the first metadata format, that is supported by the one or more original data sources; and post, by the application, to the one or more original documents in the one or more original data sources, the annotation of the one or more internal documents and the metadata about the one or more classes in the metadata format handled in the one or more original data sources.

12. The computer system of claim 11, wherein converting the first metadata format handled in the application and posting the converted metadata to the one or more original documents are implemented by the metadata handler in the application.

13. The computer system of claim 11, further comprising the program instructions executable to:

in response to one or more tags being added to the one or more internal documents, convert, by the application, the one or more tags to a tag format handled in the one or more original data sources; and post, by the application, to the one or more original documents, the one or more tags in the tag format handled in the one or more original data sources.

14. The computer system of claim 11, further comprising the program instructions executable to:

in response to the one or more internal documents being clustered into one or more classes, convert, by the application, metadata about the one or more classes to the second metadata format handled in the one or more original data sources;

post, by the application, to the one or more original documents, the converted metadata about the one or more classes in the second metadata format handled in the one or more original data sources.

15. The computer system of claim 11, further comprising the program instructions executable to:

in response to one or more labels being added to the one or more internal documents, convert, by the application, the one or more labels to a label format handled in the one or more original data sources;

post, by the application, to the one or more original documents, the one or more labels in the label format handled in the one or more original data sources.

16. The computer system of claim 11, further comprising the program instructions executable to:

in response to one or more access-control lists in a first group of the one or more internal documents being copied to a second group of the one or more internal documents, convert, by the application, metadata about the one or more access-control lists to the second metadata format handled in the one or more original data sources;

post, by the application, to the second group of the one or more internal documents, the converted metadata about the one or more access-control lists in the second metadata format handled in the one or more original data sources.

* * * * *